United States Patent
Demarmels et al.

[11] Patent Number: 5,689,223
[45] Date of Patent: Nov. 18, 1997

[54] SUPERCONDUCTING COIL

[75] Inventors: Anton Demarmels, Lenzburg, Switzerland; Sven Hörnfeldt, Västerås, Sweden; Friedrich König, Oberbözber, Switzerland; Jakob Rhyner, Zürich, Switzerland; José Maria Rivera, Lausanne, Switzerland

[73] Assignee: Asea Brown Boveri AG, Baden, Switzerland

[21] Appl. No.: 635,470

[22] Filed: Apr. 22, 1996

[30] Foreign Application Priority Data

Apr. 24, 1995 [DE] Germany ............ 195 15 003.1

[51] Int. Cl.⁶ ...................................... H01F 7/22
[52] U.S. Cl. .................. 335/216; 336/DIG. 1; 505/211; 505/231; 505/705
[58] Field of Search ............ 335/216; 336/DIG. 1; 174/125.1; 505/211, 730, 231, 232, 704, 705, 879, 880, 884, 887

[56] References Cited

U.S. PATENT DOCUMENTS 5,276,281 1/1994 Sato et al. .................. 174/125.1

FOREIGN PATENT DOCUMENTS

| 0353433 A1 | 2/1990 | European Pat. Off. |
| 1589992 | 11/1973 | Germany. |
| 3729125 A1 | 3/1989 | Germany. |
| 3803285 C2 | 7/1992 | Germany. |
| 4232703 A1 | 3/1994 | Germany. |

*Primary Examiner*—Michael L. Gellner
*Assistant Examiner*—Raymond Barrera
*Attorney, Agent, or Firm*—Burns, Doane, Swecker & Mathis, L.L.P.

[57] ABSTRACT

In order to make it possible to produce superconducting coils with small overall height, they are made from a plurality of coil subunits, optionally with a plurality of layers for each coil subunit, in particular in the case of the low-voltage coil of a transformer. The coil subunits contain as electrical conductor a high-temperature superconductor, around which a fibrous glass is spun and which is embedded in a glass-fiber reinforced epoxy resin or in a plastic. The coil subunits are placed around a transformer core in a cryostat.

17 Claims, 2 Drawing Sheets

FIG. 5
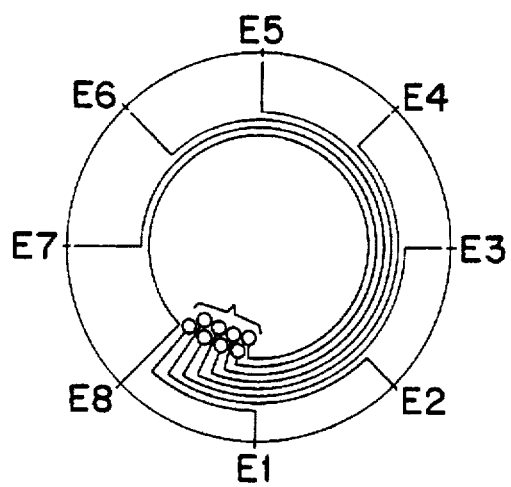
FIG. 6
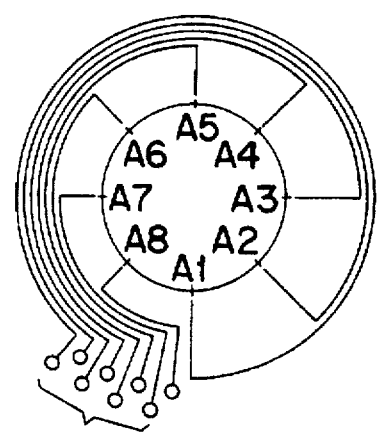
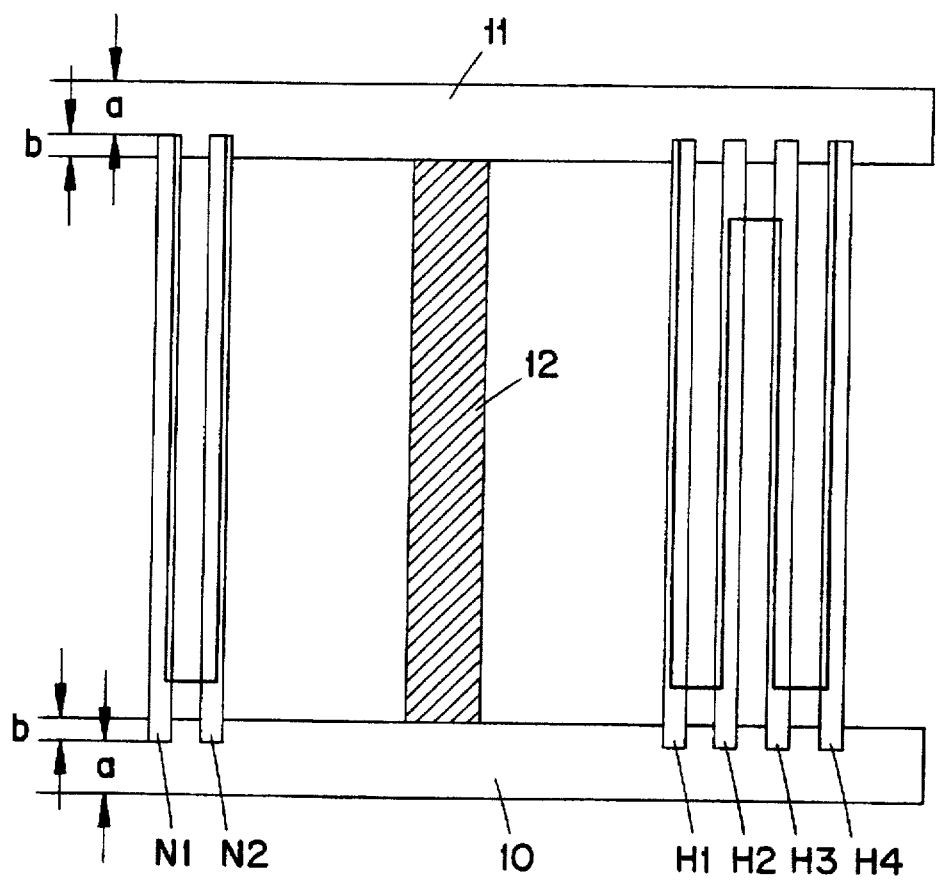
FIG. 7

SUPERCONDUCTING COIL

BACKGROUND OF THE INVENTION

1. Field of the Invention

The invention is based on a superconducting coil having at least one layer of winding elements made of a superconductor enclosed by at least one electrically insulating fiber and is embedded in an electrically insulating fiber reinforced epoxy resin or in a plastic. The invention also relates to a use of the superconducting coil.

2. Discussion of Background

EP-41-0.353,433 discloses a band-shaped initial product of a superconducting inter-metallic compound with A15 crystal structure, such as $Nb_3Sn$ or $V_3Ga$, for example. After prior cleaning and roughening of the surface, the conductor is provided on all sides with an oxide layer by plasma spraying, is wound into a coil and is converted into a superconductor in a reaction heat treatment. Before the coil is wound, a glass fabric layer is applied onto the insulated conductor. After the reaction heat treatment, the coil is impregnated with epoxy resin. A disadvantage is the expensive cooling by liquid helium.

DE-A1-4,232,703 discloses a superconducting transformer for a rail vehicle, with coils made of a high-temperature superconductor, in which cooling is carried out using liquid nitrogen. The structure of the coils is not described in further detail.

DE-B 1,589,992 discloses the connection of a plurality of winding subunits of a superconducting coil in parallel or in series.

DE 38 03 285 C2 discloses a high-temperature superconductor in which a plurality of prefabricated slotted cylindrical rings are electrically connected, via contact surfaces adjoining the slot, by mechanical compression or welding and form a toroidal coil.

DE 37 29 125 A1 discloses a process for the production of a ceramic superconducting component, in which a plurality of extremely thin superconducting and normal-conducting layers are alternately applied onto a cylindrical support. After a number of such sequences, a thicker layer of a normal-conducting material and an insulation layer are respectively applied.

SUMMARY OF THE INVENTION

Accordingly, one object of the invention is to provide a novel superconducting coil of the type mentioned at the outset, which can be produced using a high-temperature superconductor in which the superconductor is enclosed by at least one electrically insulating fiber and leads to a relatively small overall height even when the number of turns is high.

Advantageous developments of the invention are defined in the dependent patent claims.

One advantage of the invention consists in that the coils can be used for more varied applications and can be cooled more simply. If the current per coil exceeds the load carrying capacity of a high-temperature superconductor, then a plurality of conductors are connected in parallel.

According to an advantageous development of the invention, AC losses can be reduced by transposition of inner and outer layers of inner and outer coil subunits.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5 and 6 show the principle of the electrical input and output at the entry and exit of a coil, and FIG. 7 shows the clamping of the coil subunits of a transformer according to FIG. 1.

DESCRIPTION OF THE PREFERRED EMBODIMENTS

Figure 1:
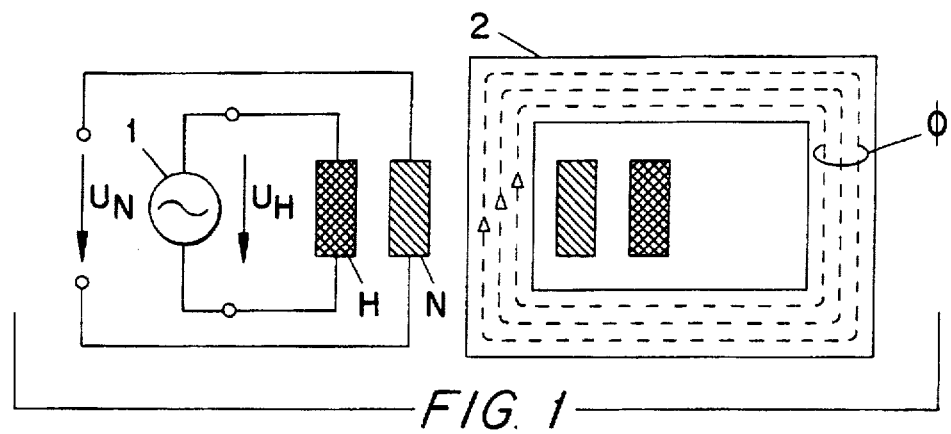
FIG. 1 shows a block diagram of a transformer.

Referring now to the drawings, wherein like reference numerals designate identical or corresponding parts throughout the several views, FIG. 1 shows, in a block diagram, a superconducting transformer for an electrical power of, for example, 630 kVA and a frequency of 50 Hz with a laminated iron core or transformer core (2), a low-voltage coil (N), which during operation delivers a low voltage ($U_N$) of, for example, 420 V on the output side, and an overlying high-voltage coil (H) to which a high voltage ($U_H$) of, for example, 18.7 kV is fed from a high-voltage mains or from a high-voltage source (1). ($\Phi$) designates a magnetic flux in the transformer core (2).

Figure 2:
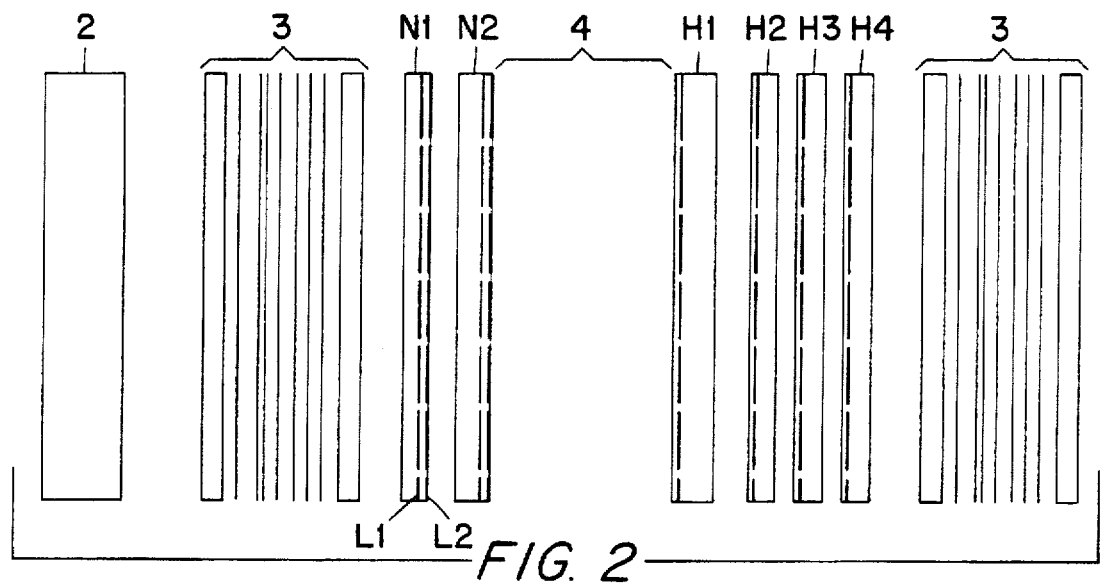
FIG. 2 shows a partial section through the magnetic core and cooled low-voltage and high-voltage coil subunits of the transformer according to FIG. 1.

FIG. 2 shows a cross section through the limb, enclosed by the two coils (N, H), of the cross-sectionally rectangular transformer core (2) according to FIG. 1, with 2 coil subunits (N1, N2) of the low-voltage coil (N) and 4 coil subunits (H1–H4) of the high-voltage coil (H), which are located in the interior of this rectangular transformer core (2) and inside a cryostat (3). The cryostat (3), which is filled with liquid nitrogen during operation, is 25 mm thick. A cooling channel (4) between the low-voltage coil (N) and the high-voltage coil (H) has a width of 5 mm. The separation between the transformer core (2) and the cryostat (3) is equal to 15 mm. The coil subunits (N1, H2–H4) are 5 mm thick and the coil subunits (N2) and (H1) are respectively 8 mm and 7 mm thick. The coil subunit (N1) is separated by 25 mm, and the coil subunit (H4) is separated by 30 mm, from the cryostat (3).

The coil subunits (N1, N2; H1–H4) have a mutual separation of 5 mm, the coil subunits (N1, N2) having 2 layers (L1, L2) each, and the coil subunits (H1–H4) having one layer each, of a high-temperature superconductor.

Each band-shaped high-temperature superconductor consists of a plurality of wires or filaments made of $Bi_2Sr_2Ca_2Cu_3O_{10}$, which are embedded in a silver matrix; it has a width of 2.5 mm and a thickness of 0.25 mm. This high-temperature superconductor is embedded in a fiber-reinforced, preferably glass-fiber reinforced, epoxy resin or in a plastic with a similar thermal expansion to metal. The high-temperature superconductor forms the layers (L1, L2) of the coil subunit (N1).

A thickness (d) of the embedding in the epoxy resin or plastic is dimensioned, preferably >2 mm, in the radial force direction in such a way that the mechanical forces which occur in the event of a short circuit are taken up without the high-temperature superconductor exceeding a critical strain of 0.2%. In the direction opposite to this force direction, a thickness (c) of the epoxy resin or plastic is so thin, preferably ≦2 mm, in particular ≦0.6 mm, that the dissipated heat produced in the high-temperature superconductor can very efficiently be transferred to the coolant, cf. FIG. 3. The separation between neighboring high-temperature superconductor layers (L1, L2) of a low-voltage coil (N1, N2) is likewise ≦2 mm, preferably ≦0.6 mm.

Figure 3:
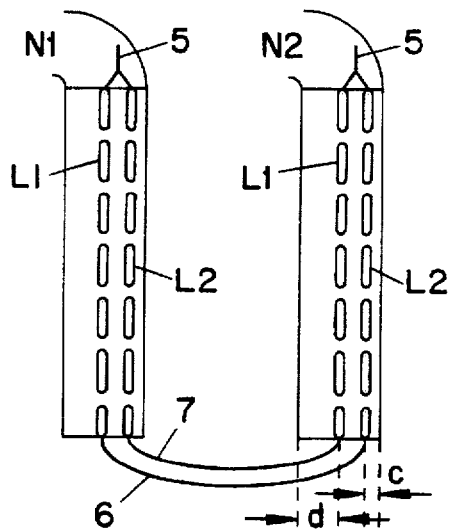
FIG. 3 shows low-voltage coils according to FIG. 2 with parallel layers or conductors.

FIG. 3 schematically shows 2 low-voltage coils (N1, N2) according to FIG. 2, with in each case 2 neighboring high-temperature superconductor layers (L1, L2) which are embedded in a glass-fiber reinforced epoxy resin and, on the end side, are connected in series via electrical lines (6, 7) made of normal conductors or high-temperature superconductor, and are connected in parallel via line connectors or contacts or silver plates (5). In the case of a plurality of layers (L1, L2), as in the case of the connection represented, the current is transposed between the layers in order to minimize AC losses. This is the best transposition which can be achieved with currently known high-temperature superconductors. Contact is made at the end of the coil by soldering on a silver plate (5) common to all the layers (L1, L2).

If the current per coil (N) exceeds the load carrying capacity of a high-temperature superconductor, then a plurality of conductors are connected in parallel, in particular in the low-voltage coil (N).

Figure 4:
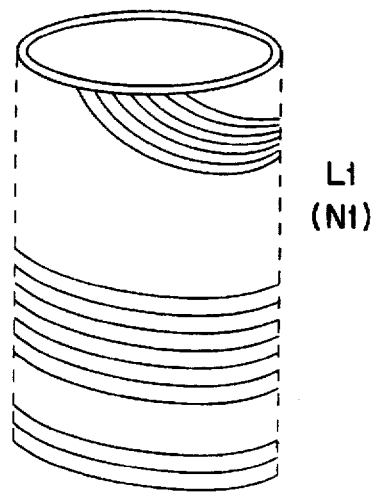
FIG. 4 shows a detail of a perspective view of a low-voltage coil subunit with a plurality of parallel conductors.

FIG. 4 shows, as an alternative to the illustrative embodiment in FIG. 3, a detail, in perspective, of a layer (L1) of the low-voltage coil (N1) with 7 parallel conductors.

FIGS. 5 and 6 show a virtually point-like, i.e. very localized current input (8) into the coil and a virtually point-like current output (9) from the coil, from the warm surroundings into the cold cryostat (3).

Preferably, the input and output lines (E1–E8, A1–A8) of the coil subunits (N1, N2; H1–H4) at the start of the coil and at the end of the coil, respectively, have an equal mutual separation, such that the input and output lines (E1–E8, A1–A8) are uniformly distributed over the coil circumference. The sum of the lengths of each conductor path, on the start and end sides, of the high-temperature superconductors is approximately equal, such that conductor paths (E1) which are shorter on the input side are longer on the output side (A1), and vice versa (E8, A8). By virtue of such a way of making contact between the ends of the high-temperature superconductors with the current input (8) and current output (9), it is possible to produce just one coil turn. A compact design is thereby achieved.

The result of the transpositions of the inner and outer layers (L1, L2) of the inner and outer coil subunits (N1, N2) at the lower end of the low-voltage coil (N), cf. FIG. 3, is that the current is distributed uniformly over the various layers (L1, L2). This leads to the desired minimization of the AC losses.

FIG. 7 shows the clamping of the coil subunits (N1, N2; H1–H4) in 2 support rings or lower and upper spacers (10, 11), which are held by at least one electrically insulating tie bar (12) at a predeterminable mutual separation of 0.75 m. The coil subunits (N1, N2; H1–H4) penetrate into the spacers (10, 11) over a predeterminable length (b) of 5 mm, with a remaining residual depth (a) of 15 mm. The axially directed forces, which primarily occur in the event of a short circuit, are taken up by these spacers (10, 11).

The low-voltage coil (N) is designed with 13 turns, of which only 7 are represented in FIG. 3, and 2 coil subunits (N1, N2) with two conductor layers (L1, L2) each. For each layer (L1, L2), 36 conductors are connected in parallel (in FIG. 4, only 7 parallel-connected conductors are represented), so that 72 conductors are wound on a coil subunit with 6 turns each. The 13th turn is formed by the current input (8) and the current output (9).

What is important is that, instead of an initial product, the finished high-temperature superconductor is wound into a coil with a minimum radius of 15 cm.

It is clear that dimensions for the coils and the transformer other than those specified may be use.

Obviously, numerous modifications and variations of the present invention are possible in light of the above teachings. It is therefore to be understood that within the scope of the appended claims, the invention may be practiced otherwise than as specifically described herein.

What is claimed is:

1. A superconducting coil
   a) having at least one layer of winding elements made of a superconductor,
   b) in which the superconductor is enclosed by at least one electrically insulating fiber and
   c) is embedded in an electrically insulating, fiber-reinforced epoxy resin or in a plastic, wherein
   d) the superconductor is a high-temperature superconductor, and
   e) the coil has at least two coil subunits with high-temperature superconductors, which are electrically connected in series by at least one normal conductor.

2. The superconducting coil as claimed in claim 1, wherein
   each coil subunit has a plurality of superposed layers of high-temperature superconductors connected electrically and mechanically in parallel.

3. The superconducting coil as claimed in claim 2, wherein an outer layer of an inner coil subunit is electrically connected in series to an inner layer of an outer coil subunit.

4. The superconducting coil as claimed in claim 2, wherein
   a) the separation of neighboring layers of high-temperature superconductors is ≦2 mm.

5. The superconducting coil as claimed in claim 4, wherein the separation is ≦0.6 mm.

6. The superconducting coil as claimed in claim 2, wherein
   in the force direction of the coil subunit which is not subjected to significant radial loading, the high-temperature superconductor has a separation of ≦2 mm.

7. The superconducting coil as claimed in claim 6, wherein the separation is ≦0.6 mm.

8. The superconducting coil as claimed in claim 2, wherein a thickness (d) to which the high-temperature superconductor is embedded in the epoxy resin or plastic in the radial force direction of the coil subunits is >2 mm.

9. The superconducting coil as claimed in claim 1, wherein
   the coil subunits are electrically connected to one another via a common highly conductive contact.

10. The superconducting coil as claimed in claim 9, wherein the common highly conductive contact comprises a silver plate.

11. The superconducting coil as claimed in claim 1, wherein
   a) the input and output lines of the coil subunits at the start of the coil and at the end of the coil, respectively, have an equal mutual separation, such that the input and output lines are uniformly distributed over the coil circumference, and b) the sum of the lengths of each conductor path, on the start and end sides, of the high-temperature superconductors is approximately equal, such that conductor paths which are shorter on the input side are longer on the output side, and the conductor paths which are longer on the input side are shorter on the output side.

12. The superconducting coil as claimed in claim 1, wherein the coil subunits are held fixed in position on the end side in spacers.

13. The superconducting coil as claimed in claim 1, wherein the subunits include at least one low-voltage coil and at least one high-voltage coil.

14. The superconducting coil as claimed in claim 1, wherein the superconducting coil forms part of a superconducting transformer.

15. The superconducting coil as claimed in claim 1, further comprising a transformer core, the coil subunits enclosing a portion of the transformer core.

16. The superconducting coil as claimed in claim 15, wherein the subunits include at least two low-voltage coils and at least two high-voltage coils inside a cryostat.

17. The superconducting coil as claimed in claim 16, wherein each of the subunits includes inner and outer superconducting layers comprising wires or filaments of high temperature superconducting material.

* * * * *